United States Patent [19]

Keeler

[11] Patent Number: 5,192,978
[45] Date of Patent: Mar. 9, 1993

[54] APPARATUS AND METHOD FOR REDUCING SOLAR NOISE IN IMAGING LIDAR, UNDERWATER COMMUNICATIONS AND LIDAR BATHYMETRY SYSTEMS

[75] Inventor: R. Norris Keeler, McLean, Va.

[73] Assignee: Kaman Aerospace Corporation, Bloomfield, Conn.

[21] Appl. No.: 761,065

[22] Filed: Sep. 17, 1991

[51] Int. Cl.$^5$ .................................................. G01C 3/08
[52] U.S. Cl. ......................................... 356/5; 356/342; 358/99
[58] Field of Search ............... 356/342, 5, 4; 358/228, 358/99; 250/574

[56] References Cited

U.S. PATENT DOCUMENTS

| | | | |
|---|---|---|---|
| 3,862,257 | 8/1989 | Ulich | 358/95 |
| 4,963,024 | 10/1990 | Ulich | 356/342 |
| 5,013,917 | 5/1991 | Ulich | 250/330 |
| 5,034,810 | 7/1991 | Keeler | 356/5 |
| 5,091,778 | 2/1992 | Keeler | 358/95 |

Primary Examiner—Mark Hellner
Attorney, Agent, or Firm—Fishman, Dionne & Cantor

[57] ABSTRACT

The present invention employs an optical filter which rejects substantially all wavelengths except for a selected wavelength. This invention eliminates most optical noise (e.g., solar noise) in LIDAR (light detection and ranging) imaging systems as well as LIDAR bathymetry systems and underwater submarine communication systems. The selected wavelength corresponds to the transmission wavelength of the laser. In accordance with the LIDAR systems of the present invention, a laser beam of the selected wavelength is projected at a body of water wherein a return beam is generated. The reflected or backscattered return beam is collected by optics which then directs the beam at the filter. The beam is filtered so that substantially all other wavelengths not corresponding to the selected wavelength are rejected, thereby eliminating most optical noise, particularly solar noise. The filtered beam is then detected. In accordance with the underwater communication system of the present invention, an encoded laser beam of the selected wavelength is projected at an underwear location (e.g., submarine). This beam is collected by optics which then directs the beam at the filter. Again, the beam is filtered so that substantially all other wavelengths not corresponding to the selected wavelength are rejected, thereby eliminating most optical noise, particularly solar noise. The filtered beam is then detected and provides a signal to be decoded.

48 Claims, 3 Drawing Sheets

APPARATUS AND METHOD FOR REDUCING SOLAR NOISE IN IMAGING LIDAR, UNDERWATER COMMUNICATIONS AND LIDAR BATHYMETRY SYSTEMS

BACKGROUND OF THE INVENTION

This invention relates generally to a method and apparatus for remote imaging of objects enveloped by a backscattering medium which is at least partially transmitting to light. More particularly, this invention relates to a method for detecting and imaging underwater objects from an airborne platform or from a submarine using a LIDAR (light detection and ranging) imaging system which employs a novel filtering scheme to minimize optical noise, particularly solar noise. This invention also relates to laser systems for use in (1) a LIDAR bathymetry system; and (2) submarine communications between both underwater and above-water locations.

It is desirable in a number of military and civilian applications to search a volume within a backscattering medium for the presence of certain targets. For instance, moored or bottom mines deployed in ocean shipping lanes are a hazard to navigating ships used both for military and for commercial purposes. For other civilian applications such as law enforcement on the ocean, it is desirable to detect the presence of submerged fishing nets, drug carrying containers or smuggled contraband. In or near harbors and beaches, it is also desirable to detect submerged obstructions, cables, pipelines, barrels, oil drums, etc. In strictly military applications, anti-submarine warfare requires an effective means of detecting and locating submarines.

Presently, cumbersome and time consuming wire line devices must be used for detecting underwater targets from remote airborne locations. These devices are lowered into the water and of course, are easily subject to damage and loss. Also, wire line devices make target searching relatively slow and can only detect targets without providing visual imaging.

An important and novel system for remote detection and imaging of objects underwater (or objects obscured by other backscattering media which is at least partially transmitting to light such as ice, snow, fog dust and smoke) from an airborne platform has been described in U.S. Pat. No. 4,862,257 and U.S. Pat. No. 5,013,917, both of which are assigned to the assignee hereof and incorporated herein by reference. The imaging LIDAR system of U.S. Pat. No. 4,862,257 utilizes a laser to generate short pulses of light with pulse widths on the order of nanoseconds. The laser light is expanded by optics and projected down toward the surface of the water and to an object or target. U.S. Pat. No. 5,013,917 relates to an imaging LIDAR system intended for night vision.

Imaging LIDAR systems of the type described hereinabove are also disclosed in commonly assigned U.S. Pat. Nos. 4,964,721 and 4,967,270, both of which are assigned to the assignee hereof and fully incorporated herein by reference. U.S. Pat. No. 4,964,721 relates to an imaging LIDAR system which controls camera gating based on input from the aircraft on board altimeter and uses a computer to thereby adjust total time delay so as to automatically track changing platform altitude. U.S. Pat. No. 4,967,270 relates to a LIDAR system employing a plurality of gated cameras which are individually triggered after preselected time delays to obtain multiple subimages laterally across a target image. These multiple subimages are then put together in a mosaic in a computer to provide a complete image of a target plane preferably using only a single light pulse.

U.S. Ser. No. 565,631 filed Aug. 10, 1990 which is also assigned to the assignee hereof and fully incorporated herein by reference, relates to an airborne imaging LIDAR system which employs multiple pulsed laser transmitters, multiple gated and intensified array camera receivers, an optical scanner for increased field of regard, and a computer for system control, automatic target detection and display generation.

U.S. Ser. No. 565,631 provides a means for rapidly searching a large volume of the backscattering medium (e.g., water) for specified targets and improves upon prior art devices in performance as a result of having more energy in each laser pulse (due to simultaneous operation of multiple lasers) and a more sensitive detection system using multiple cameras. The several cameras may be utilized to image different range gates on a single laser pulse or several cameras can be gated on at the same time to provide independent pictures which can then be averaged to reduce the noise level and improve sensitivity. Both of these improvements result in higher signal-to-noise ratio and thus higher probability of detection or greater range of depth capability.

U.S. Pat. No. 4,963,024 (which is also assigned to the assignee hereof and incorporated herein by reference) relates to a laser based optical system of the type described above used for remote detection of the diffuse attenuation coefficient or $K_s$ factor over very large areas and over relatively short time periods. In accordance with U.S. Pat. No. 4,963,024, a laser is used to generate short pulses (e.g., about less than 10 nm) of light with pulse widths on the order of nanoseconds. The laser light is expanded by optics and projected down toward the surface of the water. An intensified CCD (charge coupled device) camera is electronically shuttered after an appropriate time delay such that the image formed by the camera is composed of light backscattered by the water from a layer of range z and a thickness of delta z. The signal detected by the camera is $S_i$. If several measurements of $S_i$ are made at known time delay differences such that the differences of range gates $z_i$ are also known, then K can be calculated. This just described optical system thus functions as a K-meter.

Other patents related to imaging lidar systems include U.S. Pat. Nos. 5,029,009 and 5,034,810, both of which are assigned to the assignee hereof.

U.S. Pat. application Ser. No. 632,377 filed in Dec. 21, 1990, and U.S. Pat. application Ser. No. 632,398 also filed Dec. 21, 1990, are also assigned to the assignee hereof and incorporated herein by reference. U.S. Ser. No. 632,377 relates to a LIDAR system which employs a laser tuned to a wavelength selected to optimize performance. U.S. Ser. No. 632,398 relates to an underwater communications system which employs a laser tuned to a wavelength selected to optimize performance.

It is known in the art to use various types of filters and filter receivers in an attempt to limit optical noise in the above-described systems. The most commonly employed filters are the birefringent, the Lyot filter, and the dielectric filter. However, these filters suffer from several distinct disadvantages. For example, such filters typically have a limited (or narrow) acceptance bandwidth. Since the narrower the acceptance bandwidth, the smaller the acceptance angle, then such prior art filters have limited utility. Thus, at acceptance bandwidths much less than 1-2 nm, the narrow acceptance angle becomes restrictive, particularly in imaging lidar applications.

Known atomic resonance filters (such as disclosed in U.S. Pat. No. 4,292,596) also suffer from several disadvantages. The atomic resonance filters have a relatively long response time which is based on the relaxation time "t", of the atomic system on which they are based (t is greater than 30 ns). Thus, the use of atomic resonance filters as an imaging filter is severely limited by the wavelengths associated with the hyperfine line structure of alkali metal atoms by the requirement of a "pump laser" and a low overall detection efficiency (approx. 0.05%). Further, with atomic resonance filters, there is associated a wavelength upshift which requires that more efficient photodetectors or CCD (charge coupled device) cameras be employed.

While well suited for its intended purposes, the above-described optical systems (e.g., imaging lidar and submarine communications systems) are susceptible to optical noise. This problem is particularly troublesome during daylight operation due to the effects of solar noise.

SUMMARY OF THE INVENTION

The above-discussed and other drawbacks and deficiencies of the prior art are overcome or alleviated by the present invention which uses a filter scheme to eliminate most optical noise (including solar noise) in imaging laser detection and ranging (LIDAR) systems as well as underwater communication systems and bathymetry systems. The present invention is particularly well suited for the filtering of solar noise which can pose a serious problem to optically based imaging, underwater communications and bathymetry systems. In accordance with the LIDAR imaging system of the present invention, a laser provides laser light at a preselected wavelength in the blue region of the visible optical spectrum (400-480 nm), generally at the so-called Jerlov minimum, which is dependent upon the optical characteristics of the particular water present. The LIDAR system of this invention is substantially similar to the LIDAR systems described above (particularly U.S. Ser. No. 632,398 and U.S. Pat. Nos. 4,862,257 and 4,967,270) with the primary distinction of the filter scheme employed.

In the present invention, the laser light is generated in the form of short pulses (nanoseconds or greater in duration), expanded by optics and projected below the surface of the water (e.g., ocean) onto various objects, natural or man made. At the same time, one (or more) CCD cameras are shuttered and gated to correspond to the round trip travel time and the thickness of the section (e.g., volume) of the water observed. Upon return, the light is split into two beams of different polarization, and passed through two Faraday Anomalous Dispersion Optical Filters (FADOF). The filtered beams are recombined and a combined beam is impinged on detecting optics, i.e., the CCD camera, or another type of detector system. It should be noted that it is not necessary to gate the filter, as long as the receiver itself is gated (e.g., so long as a gated camera-receiver is utilized).

In accordance with the underwater communication system of this invention, a laser provides laser light at a preselected wavelength in the blue region of the visible optical spectrum (400-480 nm), generally at the Jerlov minimum. The laser light is generated in the form of short pulses (nanoseconds or greater in duration), expanded by optics and projected below the surface of the water (e.g., ocean) in the vicinity of a stationary or moving underwater target location (e.g., submarine) with which communication is desired. The light (containing an encoded communication) is collected by collecting optics and passed through a FADOF. The light is detected, then decoded and processed in the underwater target location. For submarine communication applications, gating may be desirable.

In accordance with the bathymetry system of this invention, a laser provides laser light at a preselected wavelength in the blue region of the visible optical spectrum (400-480 nm), generally at the Jerlov minimum. The laser light is generated in the form of short pulses (nanoseconds or greater in duration), expanded by optics and projected below the surface of the water (e.g., ocean). Upon return, the light is passed through a FADOF. The light is then detected and processed by a video presentation storage unit.

The above discussed and other features and advantages of the present invention will be appreciated and understood by those of ordinary skill in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

The present invention provides a noise filtering scheme for use in LIDAR imaging, LIDAR bathymetry and underwater communications systems. The present invention is particularly well suited for filtering solar noise in such systems. In accordance with an important feature of this invention, a Faraday Anomalous Dispersion Optical Filter (FADOF) is selected for operation at the wavelength for optical transmission through the water, so that it is the acceptance frequency of the FADOF which determines the laser transmitter wavelength for the system. The operation of a FADOF is described more fully in Ultra High Noise Rejection Optical Filter, D.J. Dick and T.M. Shay, Optics Letters, Vol. 16, No. 11, Jun. 1, 1991, pp 867-869.

Figure 1:
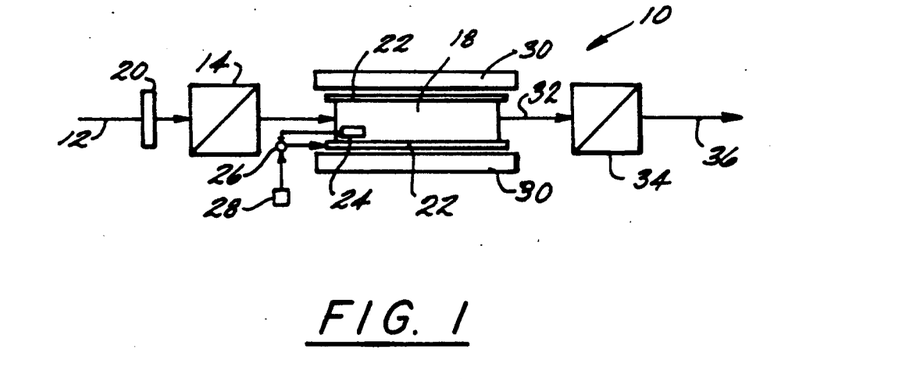
FIG. 1 is a schematic diagram of a Faraday Anomalous Dispersion Optical Filter (FADOF) in accordance with the present invention.

Referring first to FIG. 1, a Faraday Anomalous Dispersion Optical Filter (FADOF) is shown generally at 10. In accordance with filter 10, a laser light beam 12

(the source of which is to be described hereinafter) of, for example 455 nm is impinged on a prism polarizer 14. Polarizer 14 is preferably a Glan-Thompson calcite prism polarizer having a clear aperture. Glan-Thompson calcite prism polarizers generally have an extinction coefficient of $10^{-6}$. Polarizer 14 produces a linearly polarized light beam 16 which enters a pyrex cesium (Cs) vapor cell 18. Cesium has hyperfine lines at both 455 and 459 nm. Thus, only light at those wavelengths will pass through the cesium vapor in cell 18. It may be necessary to eliminate the 459 nm lines. This can be accomplished by eliminating that wavelength from the input laser beam 12 with a notch filter 20 positioned prior to polarizer 14. Alternatively, a volume filter may be employed (such as is described in U.S. Ser. No. 599,158 filed Oct. 17, 1990 assigned to the assignee hereof and incorporated herein by reference) to eliminate the 459 nm lines.

Temperature control of cell 18 may be achieved by heat tapes or other resistive heating elements 22 disposed there around. The temperature in cell 18 is sensed by a thermo couple 24 to provide an electrical signal indicative of temperature which is employed by a controller 26 in conjunction with a current source 28 to control heating elements 22 as is known. A electromagnetic field is generated about cell 18 by a solenoid 30 having a plurality of coils wherein an electric current flowing through the coils generates a magnetic field. It is intended that the magnetic field be constant and not gated, however, if it is required that the field be gated, this can be done by controlling the electric current to the coils of solenoid 30. With a constant magnetic field, solenoid 30 may be replaced by a permanent magnet which generates a similar field.

Due to the characteristics of the cesium, only light at the wavelength of 455 nm (i.e., the 455 nm hyperfine lines) will be emitted from cell 18. It will appreciated that input laser light 12 of different wavelengths may be employed, however a corresponding vapor cell 18 must be selected having hyperfine lines at that wavelength. Vapor cell 18 may be a potassium vapor cell which operates at 464 nm or a rubidium vapor cell which operates at 516 and 420 nm. The light 32 emitted from cell 18 is impinged on a second Glan-Thompson polarizing prism 34 which provides an output light beam 36 having a single wavelength, in this example 455 nm. It will be appreciated that all other wavelengths originally comprising incoming light beam 12 will not pass through cell 18 (of course with the exception of the second hyperfine line at 459 nm, however this may be eliminated with the filter 20 as described hereinabove).

The linearity of the polarized light at the desired wavelength is rotated by a set amount while the light at other wavelengths is rejected. The desired angle between the two prisms 14 and 34 depends upon the dimension of cell 18. When beam 12 originates from a beam splitter (described hereinafter), a transmission efficiency greater than 50% with input circularly polarized light can be obtained. With a monochromatic light source providing beam 12, the bandwidth for solar noise acceptance for sunlight can be from approximately 0.1–0.2 Å down to 0.02 Å, this is dependent on the temperature and magnetic field selected.

Figure 2:
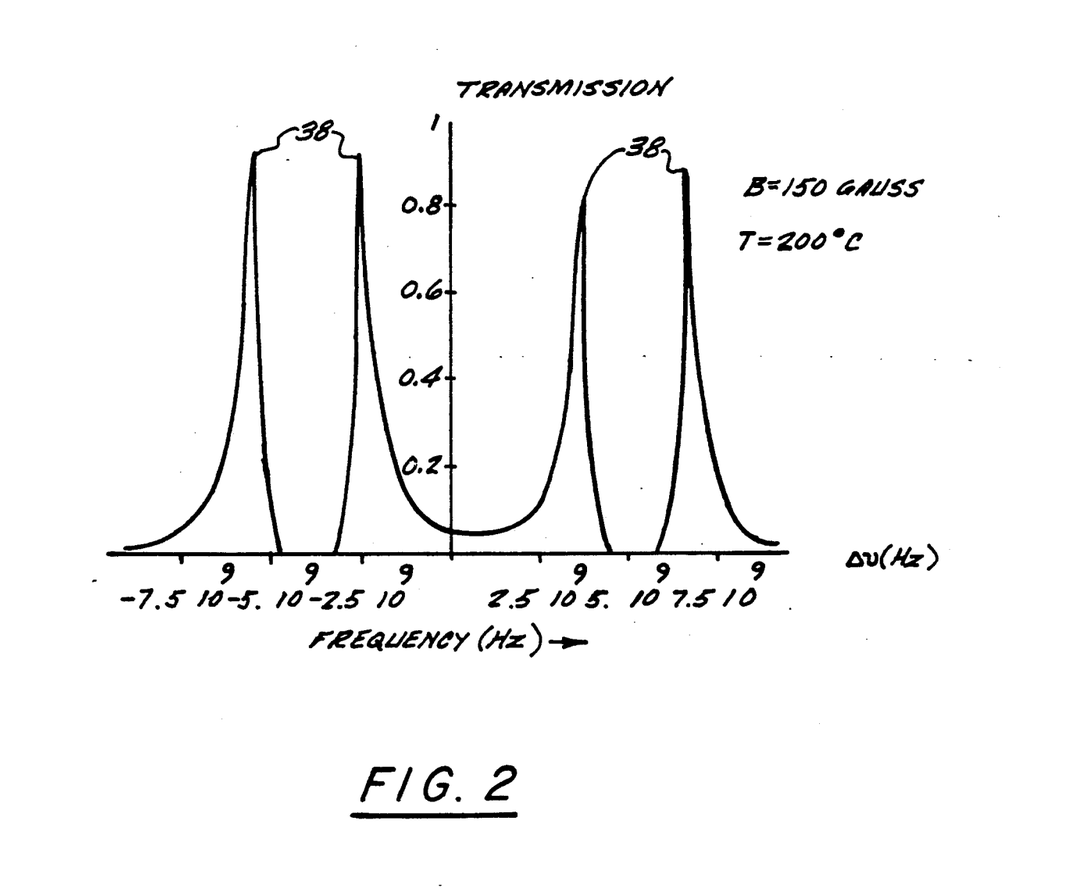
FIG. 2 is a chart of light transmittance as a function of light frequency for a Cs FADOF with a magnetic field of 200 Gauss.

Referring now to FIG. 2, a chart illustrating light transmission as a function of light frequency is shown. A light transmission of 1.0 represents the total transmission of the incident light beam 12 (FIG. 1). The frequency of light while entering filter 10 is increased and gives a quantative measure of the filter response. Peaks 38 represent the hyperfine lines of cesium atom at 455.5 nm. The magnetic field of solenoid 30 in this example is 150 Gauss and the cell temperature is 200° C. The line width (full width at 0.5 transmission) is 0.50 GHz (i.e., $\Delta\omega = 0.50$ GHz). This can be translated into an acceptance bandwidth by the relationship:

$$\Delta\lambda = (2\pi\omega)^2 \Delta\omega/c$$

wherein:
$\Delta\lambda$ is the acceptance bandwidth in meters,
$\lambda$ is the wavelength in meters, and
$\Delta\omega$ is the frequency in Hertz.

Figure 3:
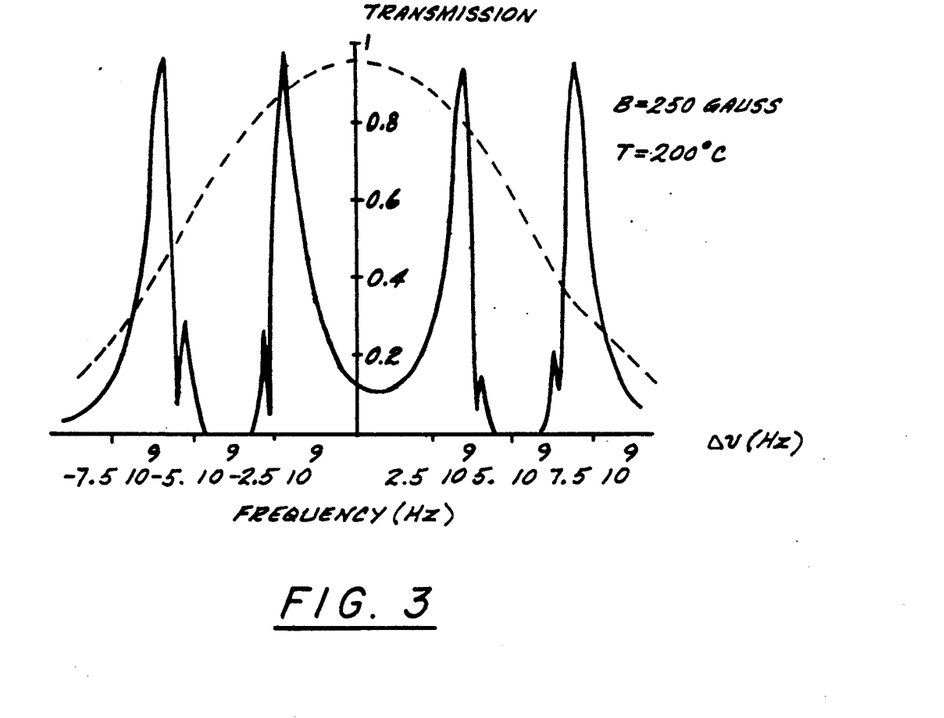
FIG. 3 is a chart of light transmittance as a function of light frequency for a Cs FADOF with a magnetic field of 250 Gauss.

Referring now to FIG. 3 wherein the effects of varying the strength of the solenoid field is illustrated. Again, light transmission is plotted as a function of light frequency. Peaks 38' representing the hyperfine lines are shifted far less than the full width at half maximum (FWHM) of each line. The FWHM has increased to 0.72 GHz. The magnetic field does not strongly effect the FWHM of the lines, which indicates that slight changes in the solenoid 30 or solenoid coils do not effect performance of filter 10. An increase in temperature causes the lines to broaden and fuse, resulting in a wide continuous peak as indicated by a line 40. Line 40 represents an acceptance bandwidth ($\Delta\lambda$) of 0.1 Å, ($1\text{Å} = 10^{-10}$ meters) the optimum for the embodiments described herein.

I. LIDAR BATHYMETRY SYSTEM

Figure 4:
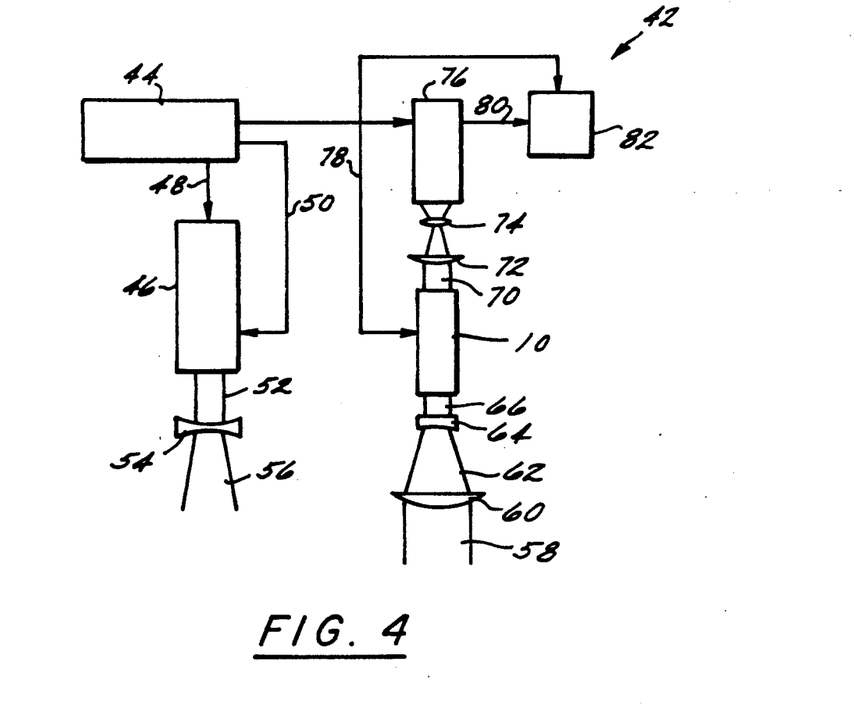
FIG. 4 is a schematic diagram of a laser bathymetry system employing the FADOF of FIG. 1 in accordance with the present inventions.

Referring now to FIG. 4, a LIDAR bathymetry system employing FADOF 10 of FIG. 1 is shown generally at 42. A control and power console 44 supplies power and triggers the discharge of a laser 46 in accordance with known methods. Laser 46 is preferably a flashlamp pumped frequency doubled Titanium Sapphire laser emitting a laser beam having a wavelength of 455 nm. Laser 46 is controlled (i.e., triggered) by signals on a line 48 originating from console 44 and laser 46 receives power from console 44 on a line 50. The emitted laser light beam 52 is expanded by expanding optics 54 such that an expanded beam 56 illuminates the ocean, its surface and the ocean bottom. A return beam 58 comprising a bottom echo, a glint echo from the ocean surface and a diffuse return from various scattering centers along the path of the laser beam enters a collecting optic lens 60. Lens 60 directs a collected return beam 62 onto a second lens 64 which provides a parallel return beam 66. Beam 66 is impinged on a FADOF 10. Although FADOF 10 is described as operating at the 455 nm wavelength, other desired wavelengths as described hereinabove may be employed. It will appreciated that the wavelength of the transmitting laser 46 will match the wavelength of FADOF 10. After beam 66 passes through FADOF 10, a light beam 70 is emitted having only light wavelengths in accordance with those that are not rejected by FADOF 10. Light beam 70 is directed by optics 72 and 74 onto a detector 76. Detector 76 converts the photo energy impinged thereon into an electrical signal. Detector 76 and FADOF 10 are powered by console 44 over a line 78. The electrical signal output from detector 76 on a line 80 is presented to a video presentation storage unit 82 which is also powered by line 78.

Thus, in accordance with the present invention, a LIDAR bathymetry system is presented which will reject substantially all wavelengths of the return laser light 58 which are not within the hyperfine lines of the filter (i.e., FADOF 10). Moreover, substantially all solar noise (i.e, sunlight) is rejected.

II. LIDAR IMAGING SYSTEM

Figure 5:
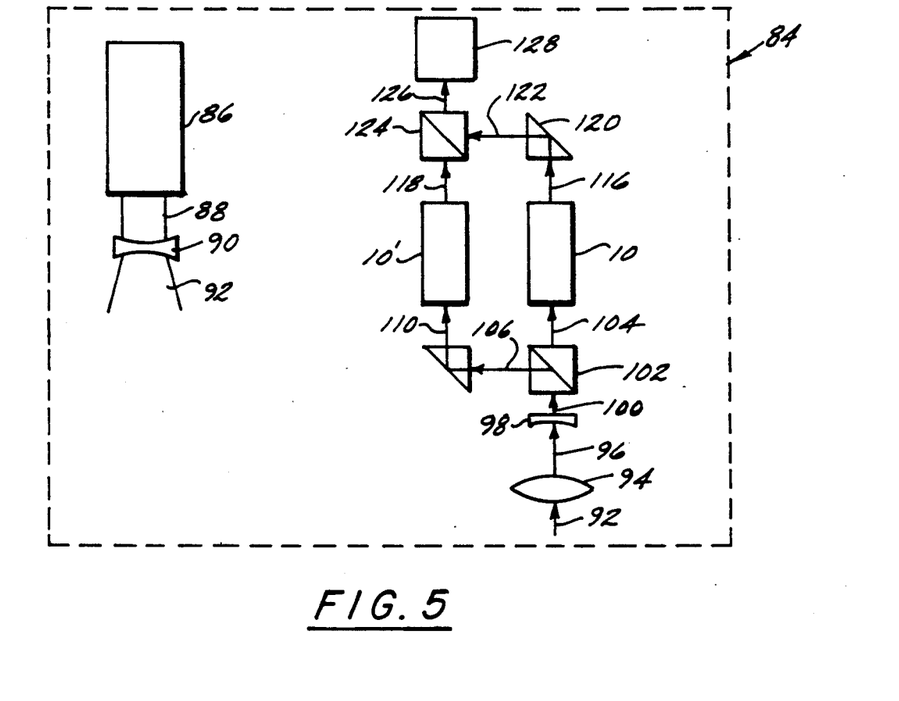
FIG. 5 is schematic diagram of an imaging LIDAR system employing two FADOFs of FIG. 1 in accordance with the present inventions.

Referring now to FIG. 5, a LIDAR imaging system employing a pair of FADOFs 10 and 10' (wherein FADOF 10 of FIG. 1 and FADOF 10' are of the same type) is shown generally at 84. In FIG. 5, a LIDAR transmitter 86 generates a plurality of light pulses. The transmitter 86 may by any one of the pulsed laser transmitters such as described in previously mentioned U.S. Ser. No. 632,377. For example, the laser may comprise a tuneable, frequency doubled Titanium Sapphire laser. Otherwise, with the exception of the filtering scheme, the several components of the LIDAR system of FIG. 2 are substantially similar to the LIDAR system components described in previously mentioned U.S. Pat. Nos. 4,862,257 and 4,964,721. Laser 86 generates a series of blue light pulses 88, in this example at 455 nm. Light 88 passes through expanding optics 90 to provide expanded beam 92. The radiated pulses 92 of expanding dimensions illuminate a volume in the ocean below the surface.

A reflected pulse 92 is collected by optics 94 and a collected beam 96 is directed at a second lens 98 providing a parallel beam 100. Additionally, optics 98 may also provide filtering of beam 96. Beam 100 then passes through a polarized beam splitter 102 producing beams 104 and 106. Beam 106 is impinged on a turning prism 108 providing a directed beam 110. Beams 104 and 110 are filtered by FADOFs 10 and 10' respectively. FADOF 10 provides a filtered beam 116 and FADOF 10' provides a filtered beam 118. In the present example, these beams 116, 118 comprise only the 455 nm components of any light collected by lens 94 (due to the filtering by FADOFs 10 and 10').

Beam 116 is directed by a turning prism 120 to provide a beam 122. Beams 122 and 118 are combined in a recombining prism 124, prism 124 being of the same type as prism 102. The recombination of the two originally separated beams 104, 106 minimizes the losses in the filtering process. The beams are divided in order to minimize filter (i.e., FADOF) losses, and therefore, it will be appreciated that the number of divided beams and corresponding FADOFs may be varied. A transmission efficiency of greater than 50% can be obtained with divided beams. With a monochromatic light beam 88, the bandwidth for solar noise acceptance for sunlight can be from approximately 0.1–0.2 Å down to 0.02 Å; this is dependent on the temperature and magnetic field selected. When only one FADOF is used, up to half of the return light can be lost, however it should be noted that optical alignment is much simpler. The alignment of beams 118 and 122 is important so that the image of the recombined beams will substantially coincide. The closeness of realignment required depends upon the definition desired in the CCD image. A combined beam 126 being the output of prism 124 is impinged on receiver optics of a CCD camera 128. The cameras are gated by pulse timing generators set to a time delay corresponding to the round trip distance to the target. The vertical distance "1" in feet imaged is equal to $1 = \Delta\tau/2n$ with n being the refractive index of sea water and $\Delta\tau$ the gate width. The gated volume is bounded by this vertical distance in feet, and that horizontal area of laser illuminated water that is within the view of the camera(s). The volume imaged by this procedure can be recorded on video tapes and presented on an appropriate video display.

Thus, in accordance with the present invention, a LIDAR imaging system is presented which will reject substantially all wavelengths of the return laser light 92 which are not within the hyperfine lines of the filter (i.e., FADOFs 10 and 10'). Moreover, substantially all solar noise (i.e, sunlight) is rejected.

III. SUBMARINE COMMUNICATIONS

Figure 6:
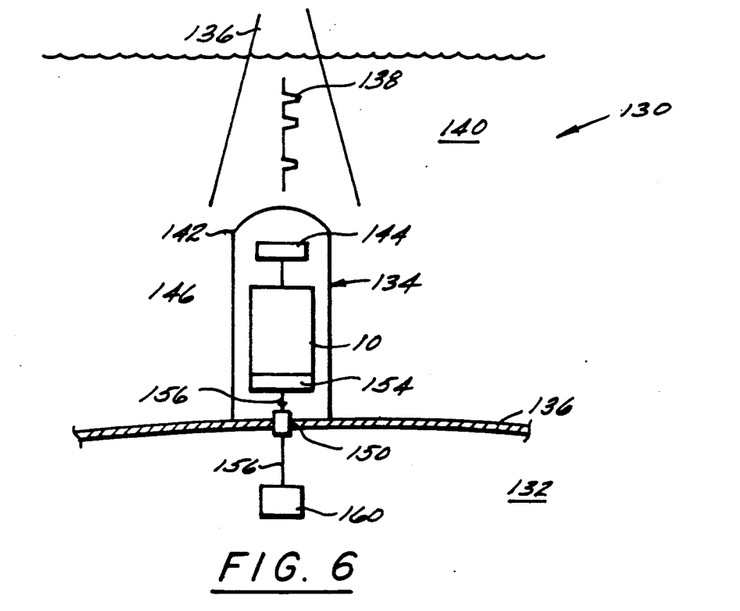
FIG. 6 is schematic diagram of a submarine communications system employing the FADOF of FIG. 1 in accordance with the present inventions.

Referring now to FIG. 6, an underwater (e.g., submarine) optical communications receiver employing FADOF 10 of FIG. 1 is shown generally at 130. In FIG. 1, a submarine 132 (or other moving or stationary underwater location) has a receiver 134 which extends outwardly from a surface 136 of submarine 132 for receiving optical communications signals. Optical communication signals are sent from either an aircraft or a ship by a transmitter (not shown) of the type described in FIG. 5 (i.e., transmitter 86 in combination with expanding optics 90). An encoded beam 136 comprising an encoded message as illustrated by 138 is spread generally over several thousand square kilometers (when transmitted by an aircraft). It will appreciated that with a laser of sufficient power, transmission may be from a satelite or other spacecraft. The pulse beam 136 passes through the ocean 140 and impinges transmitter 134. Transmitter 134 comprises a transparent shield 142 which allows beam 138 to pass therethrough. Beam 138 is collected by optics 144 and a collected beam 146 impinges FADOF 10. Beam 146 is filtered by FADOF 10, the filtered light (i.e., having only wavelengths within the hyperfine lines as shown in FIGS. 3 or 4) is impinged on a detector 54. Thus, any optical noise (i.e., solar noise) is rejected by the filter and only the wavelength of the transmitting laser is received. Detector 154 generates an electrical signal on wires 156 which corresponds to the photo energy impinged thereon. Wires 156 pass through an opening of submarine 132 via a fitting 158. Wires 156 are presented to a decoder and processor 160 where the message is decoded.

While only one-way communication (i.e., from above the surface to the submarine) has been described two-way communication (i.e., from above the surface to the submarine and from the submarine to above the surface or to another submarine) may be employed in accordance with the present invention. In this latter embodiment, the submarine is provided with a laser transmitter. Thus, a submarine communication system is presented which will reject all wavelengths of the laser light 136 which are not within the hyperfine lines of the filter. Moreover, substantially all solar noise (i.e., sunlight) is rejected.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A light imaging system for detection and ranging of a volume in water, comprising:
    laser transmitter means for providing a transmitted light beam, said transmitted light beam comprising a plurality of short pulses of light of a first selected wavelength;
    expanding optics means for expanding said transmitted light beam and projecting an expanded light beam at said volume in water wherein said expanded light beam is reflected back from said volume generating a return light beam;

collecting optics means for collecting said return light beam and providing a collected light beam;

dividing means for dividing said collected light beam into first and second divided light beams;

first filter means for filtering said first divided light beam, said filter means rejecting substantially all wavelengths other than said first selected wavelength, said first filter means providing a first filtered light beam;

second filter means for filtering said second divided light beam, said second filter means rejecting substantially all wavelengths other than said first selected wavelength, said second filter means providing a second filtered light beam;

recombining means for recombining said first and second filtered light beams to provide a combined light beam; and detector means for detecting said combined light beam.

2. The light imaging system of claim 1 wherein at least one of said first and second filter means comprises:

first prism polarizing means receptive to said first divided light beam for providing a polarized light beam;

a vapor cell having a hyperfine line of transmittance at said first selected wavelength, said vapor cell being receptive to said polarized light beam and for providing a filtered polarized light beam wherein substantially all wavelengths other than wavelengths within said hyperfine line are rejected;

heat control means disposed about said vapor cell for controlling the temperature therein;

means for generating an electromagnetic field in said cell; and second prism polarizer means receptive to said filtered polarized light beam for providing said first filtered light beam.

3. The light imaging system of claim 2 wherein at least one of said first and second prism polarizers comprise:

a Glan-Thompson calcite prism polarizer.

4. The light imaging system of claim 2 wherein said vapor cell comprises:

a pyrex cesium vapor cell.

5. The light imaging system of claim 2 wherein said first filter means further comprises:

third filter means for filtering said first divided light beam, said third filter means rejecting a second selected wavelength.

6. The light imaging system of claim 1 wherein at least one of said first and second filter means comprises:

a Faraday Anomalous Dispersion Optical Filter.

7. A method for detecting and ranging a volume in water, the method comprising the steps of:

transmitting a light beam, said light beam comprising a plurality of short pulses of light of a first selected wavelength;

expanding said light beam to provide an expanded light beam;

projecting said expanded light beam at said volume in water wherein said expanded light beam is reflected back from said volume generating a return light beam;

collecting said return light beam to provide a collected light beam;

dividing said collected light beam into first and second divided lights beams;

substantially rejecting all wavelengths other than said first selected wavelength in said first divided light beam to provide a first filtered light beam;

substantially rejecting all wavelengths other than said first selected wavelength in said second divided light beam to provide a second filtered light beam;

recombining said first and second filtered light beams to provide a combined light beam; and detecting said combined light beam.

8. The method of claim 7 wherein said step of substantially rejecting all wavelengths other than said first selected wavelength in said first divided light beam, comprises:

linearly polarizing said first divided light beam to provide a polarized light beam;

heating a vapor cell, said vapor cell being receptive to said polarized light beam;

generating an electromagnetic field in said vapor cell, said vapor cell providing a filtered polarized light beam wherein substantially all wavelengths other than said first selected wavelength are rejected; and linearly polarizing said filtered polarized light beam to provide said first filtered signal.

9. The method of claim 7 wherein said step of linearly polarizing said first divided light beam and said linearly polarizing said filtered polarized light beam each comprise:

a Glan-Thompson calcite prism polarizer.

10. The method of claim 7 wherein said vapor cell comprises:

a pyrex cesium vapor cell.

11. The method of claim 7 wherein said step of substantially rejecting all wavelengths other than said first selected wavelength in said first divided light beam, further comprises:

rejecting a second selected wavelength in said first divided light beam.

12. The method of claim 7 wherein said step of substantially rejecting all wavelengths other than said first selected wavelength in said second divided light beam, comprises:

linearly polarizing said second divided light beam to provide a polarized light beam;

heating a vapor cell, said vapor cell being receptive to said polarized light beam;

generating an electromagnetic field in said vapor cell, said vapor cell providing a filtered polarized light beam wherein substantially all wavelengths other than said first selected wavelength are rejected; and linearly polarizing said filtered polarized light beam to provide said first filtered signal.

13. An apparatus for detecting and imaging a volume in water:

means for generating short pulses of light from a laser transmitter at a selected wavelength;

means for projecting said generated short pulses of light toward the water and at said column in said water;

filter means for filtering said pulses of light reflected back from said volume, said filter means rejecting substantially all wavelengths of light other than said selected wavelength, said filter means comprising a Faraday Anomalous Dispersion Optical Filter;

gated detector means for detecting said pulses of light passing through said filter means; and means for converting said detected pulses of light to a video image of said volume.

14. The apparatus of claim 13 wherein said Faraday Anomalous Dispersion Optical Filter comprises:
first prism polarizer means receptive to said first divided light beam for providing a polarized light beam;
a vapor cell having a hyperfine line of transmittance at said first selected wavelength, said vapor cell being receptive to said polarized light beam and for providing a filtered polarized light beam wherein substantially all wavelengths other than wavelengths within said hyperfine line are rejected; controlling the temperature therein;
means for generating an electromagnetic field in said vapor cell; and
second prism polarizer means receptive to said filtered polarized light beam for providing said first filtered light beam.

15. The apparatus of claim 14 wherein at least one of said first and second prism polarizers comprise:
a Glan-Thompson calcite prism polarizer.

16. The apparatus of claim 14 wherein said vapor cell comprises:
a pyrex cesium vapor cell.

17. The apparatus of claim 14 wherein said Faraday Anomalous Dispersion Optical Filter further comprises:
third filter means for filtering said first divided light beam, said third filter means rejecting a second selected wavelength.

18. AN apparatus for detecting and imaging a volume in water, the apparatus employing an imaging lidar apparatus including light pulse generating means for generating light pulses at a selected operating wavelength and reflected light pulse detection means for detecting backscattered reflection, the light pulse generating means comprising a laser and further including:
filter means for filtering said pulses of light reflected back from said volume, said filter means rejecting substantially all wavelengths of light other than said selected wavelength, said filter means comprising a Faraday Anomalous Dispersion Optical Filter.

19. The apparatus of claim 18 wherein said Faraday Anomalous Dispersion Optical Filter comprises:
first prism polarizer means receptive to said first divided light beam for providing a polarized light beam;
a vapor cell having a hyperfine line of transmittance at said first selected wavelength, said vapor cell being receptive to said polarized light beam and for providing a filtered polarized light beam wherein substantially all wavelengths other than wavelengths within said hyperfine line are rejected;
heat control means disposed about said vapor cell for controlling the temperature therein;
means for generating an electromagnetic field in said vapor cell; and
second prism polarizer means receptive to said filtered polarized light beam for providing said first filtered light beam.

20. The apparatus of claim 19 wherein at least one of said first and second prism polarizers comprise:
a Glan-Thompson calcite prism polarizer.

21. The apparatus of claim 19 wherein said vapor cell comprises:
a pyrex cesium vapor cell.

22. The apparatus of Faraday Anomalous Dispersion Optical Filter further comprises:
third filter means for filtering said first divided light beam, said third filter means rejecting a second selected wavelength.

23. A method for detecting and imaging a volume in water, including the steps of:
generating short pulses of light from a laser transmitter at a selected wavelength;
projecting said generated short pulses of light toward the water and at said volume in said water;
filtering said pulses of light reflected back from said volume, said filtering rejecting substantially all wavelengths of light other than said selected wavelength, said filtering utilizing a Faraday Anomalous Dispersion Optical Filter;
detecting said pulses of filtered light reflected back from said volume using gated detector means; and
converting said detected pulses of light to a video image of said volume.

24. The method of claim 23 wherein said step of filtering substantially rejecting all wavelengths other than said first selected wavelength in said first divided light beam, comprises:
linearly polarizing said first divided light beam to provide a polarized light beam;
heating a vapor cell, said vapor cell being receptive to said polarized light beam;
generating an electromagnetic field in said vapor cell, said vapor cell providing a filtered polarized light beam wherein substantially all wavelengths other than said first selected wavelength are rejected; and
linearly polarizing said filtered polarized light beam to provide said first filtered signal.

25. A method for detecting and imaging a volume in water, the method employing an imaging lidar apparatus including light pulse generating means for generating light pulses at a selected operating wavelength and reflected light pulse detection means for detecting backscattered reflection, the light pulse generating means comprising a laser and further including the step of:
filtering said pulses of light reflected back from said volume, said filtering rejecting substantially all wavelengths of light other than said selected wavelength, said filtering utilizing a Faraday Anomalous Dispersion Optical Filter.

26. The method of claim 25 wherein said step of filtering substantially rejecting all wavelengths other than said first selected wavelength in said first divided light beam, comprises:
linearly polarizing said first divided light beam to provide a polarized light beam;
heating a vapor cell, said vapor cell being receptive to said polarized light beam;
generating an electromagnetic field in said vapor cell, said vapor cell providing a filtered polarized light beam wherein substantially all wavelengths other than said first selected wavelength are rejected; and
linearly polarizing said filtered polarized light beam to provide said first filtered signal.

27. An apparatus for underwater communication between a first location and a second location, at least one of said first and second locations being underwater, comprising:
encoder means for providing an encoded signal;

laser transmitter means responsive to said encoded signal, said laser transmitter means providing an encoded light beam, said encoded light beam comprising a plurality of short pulses of light of a first selected wavelength, said laser transmitter means being disposed at said first location;

expanding optics means for expanding said encoded light beam and projecting an expanded encoded light beam at an area of water, said area having said second location therein;

collecting optics means for collecting said expanded encoded light beam and providing a collected encoded light beam;

first filter means for filtering said collected encoded light beam, said first filter means rejecting substantially all wavelengths other than said first selected wavelength, said first filter means providing a filtered encoded light beam, said first filter means comprising a Faraday Anomalous Dispersion Optical Filter;

detector means responsive to said filtered encoded light beam, said detector means providing a detected signal indicative of said encoded filtered light beam; and decoder means for decoding said detected signal.

28. The apparatus of claim 27 wherein said first Faraday Anomalous Dispersion Optical Filter comprises:

first prism polarizer means receptive to said collected encoded light beam for providing a polarized light beam;

a vapor cell having a hyperfine line of transmittance at said first selected wavelength, said vapor cell being receptive to said polarized light beam and providing a filtered light beam wherein substantially all wavelengths other than wavelengths within said hyperfine line are rejected;

heat control means disposed about said vapor cell for controlling the temperature therein;

means for generating an electromagnetic field in said vapor cell; and second prism polarizer means receptive to said filtered light beam for providing said filtered encoded light beam.

29. The apparatus of claim 28 wherein at least one of said first and second prism polarizers comprises:

a Glan-Thompson calcite prism polarizer.

30. The apparatus of claim 20 wherein said vapor cell comprises:

a pyrex cesium vapor cell.

31. The apparatus of claim 28 wherein said first Faraday Anomalous Dispersion Optical Filter further comprises:

second filter means for filtering said collected encoded light beam, said second filter means rejecting a second selected wavelength.

32. A method for underwater communication between a first location and a second location, at least one of said first and second locations being underwater, the method comprising the steps of:

generating an encoded signal;

transmitting an encoded light beam from said first location, said encoded light beam comprising a plurality of short pulses of light indicative of said encoded signal, said encoded light beam being at a first selected wavelength;

expanding said encoded light beam to provide an expanded encoded light beam;

projecting said expanded encoded light beam at an area of water, said area having said second location therein;

collecting said expanded encoded light beam to provide a collected light beam;

substantially rejecting all wavelengths other than said first selected wavelength in said collected encoded light beam to provide a filtered encoded light beam, said rejecting using a Faraday Anomalous Dispersion Optical Filter;

detecting said filtered encoded light beam to provide a detected signal; and decoding said detected signal.

33. The method of claim 32 wherein said step of substantially rejecting all wavelengths other than said selected wavelength in said collected encoded light beam, comprises:

linearly polarizing said collected encoded light beam to provide a polarized light beam;

heating a vapor cell, said vapor cell being receptive to said polarized light beam;

generating an electromagnetic field in said vapor cell, said vapor cell for providing a filtered light beam wherein substantially all wavelengths other than said first selected wavelength are rejected; and linearly polarizing said filtered light beam to provide said filtered encoded light beam.

34. The method of claim 33 wherein said step of substantially rejecting all wavelengths other than said selected wavelength in said collected encoded light beam, further comprises:

rejecting a second selected wavelength in said collected encoded light beam.

35. A light detection and ranging bathymetry system comprising:

laser transmitter means for providing a transmitted light beam, said transmitted light beam comprising a plurality of short pulses of light at a first selected wavelength;

expanding optic means for expanding said transmitted light beam and projecting an expanded light beam at an area of water wherein said expanded light beam is reflected back generating a return light beam;

collecting optic means for collecting said return light beam and providing a collected light beam;

first filter means for filtering said collected light beam, said first filter means rejecting substantially all wavelengths other than said first selected wavelength, said first filter means providing a filtered light beam, said first filter means comprising a Faraday Anomalous Dispersion Optical Filter; and detector means for detecting said filtered light beam.

36. The bathymetry system of claim 35 wherein said first Faraday Anomalous Dispersion Optical Filter comprises:

first prism polarizer means receptive to said collected light beam for providing a polarized light beam;

a vapor cell having a hyperfine line of transmittance at said first selected wavelength, said vapor cell being receptive to said first polarized light beam and providing a filtered polarized light beam wherein substantially all wavelengths other than wavelengths within said hyperfine line are rejected;

heat control means disposed about said vapor cell for controlling the temperature therein;

means for generating an electromagnetic field in said vapor cell; and second prism polarizer means receptive to said filtered polarized light beam for providing said filtered light beam.

37. The bathymetry system of claim 36 wherein at least one of said first and second prism polarizers comprises:

a Glan-Thompson calcite prism polarizer.

38. The bathymetry system of claim 36 wherein said vapor cell comprises:

a pyrex cesium vapor cell.

39. The bathymetry system of claim 36 wherein said first Faraday Anomalous Dispersion Optical Filter further comprises:

second filter means for filtering said collected light beam, said second filter means rejecting a second selected wavelength.

40. A method for measuring the depth of water, the method comprising the steps of:

transmitting a light beam, said light beam comprising a plurality of short pulses of light of a first selected wavelength;

expanding said light beam to provide an expanded light beam:

projecting said expanded light beam at an area of water wherein said expanded light beam is reflected back generating a return light beam;

collecting said return light beam to provide a collected light beam;

substantially rejecting all wavelengths other than said first selected wavelength in said collected light beam to provide a filtered light beam, said rejecting using a Faraday Anomalous Dispersion Optical Filter; and detecting said filtered light beam.

41. The method of claim 40 wherein said step of substantially rejecting all wavelengths other than said selected wavelength in said collected light beam, comprises:

linearly polarizing said collected light beam to provide a polarized light beam;

heating a vapor cell, said vapor cell being receptive to said polarized light beam;

generating an electromagnetic field in said vapor cell, said vapor cell providing a filtered polarized light beam wherein substantially all wavelengths other than said first selected wavelength are rejected; and linearly polarizing said filtered polarized light beam to provide said first filtered signal.

42. The method of claim 41 wherein said step of substantially rejecting all wavelengths other than said selected wavelength in said collected light beam, further comprising:

rejecting a second selected wavelength in said collected light beam.

43. An apparatus for underwater communication between a first location and a second location, at least one of said first and second locations being underwater, comprising:

encoder means for providing an encoded signal:

laser transmitter means responsive to said encoded signal, said laser transmitter means providing an encoded light beam, said encoded light beam comprising a plurality of short pulses of light of a first selected wavelength, said laser transmitter means being disposed at said first location;

expanding optics means for expanding said encoded light beam and projecting an expanded encoded light beam at an area of water, said area having said second location therein;

collecting optics means for collecting said expanded encoded light beam and providing a collected encoded light beam;

dividing means for dividing said collected encoded light beam into first and second dividend encoded light beams;

first filter means for filtering said first divided encoded light beam, said first filter means rejecting substantially all wavelengths other than said first selected wavelength, said first filter means providing a filtered encoded light beam;

second filter means for filtering said second encoded divided light beam, said second filter means rejecting substantially all wavelengths other than first selected wavelength, said second filter means providing a second filtered encoded light beam;

recombining means for recombining said first and second filtered light beams to provide a combined encoded light beam; and detector means responsive to said combined encoded light beam, said detector means providing a detected signal indicative of said combined encoded beam; and decoder means for decoding said detected signal.

44. The apparatus of claim 43 wherein at least one of said first and second filter means comprises:

first prism polarizer means receptive to said collected encoded light beam for providing a polarized light beam;

a vapor cell having a hyperfine line of transmittance at said first selected wavelength, said vapor cell being receptive to said polarized light beam and providing a filtered light beam wherein substantially all wavelengths other than wavelengths within said hyperfine line are rejected;

heat control means disposed about said vapor cell for controlling the temperature therein;

means for generating an electromagnetic field in said vapor cell; and second prism polarizer means receptive to said filtered light beam for providing said filtered encoded light beam.

45. The apparatus of claim 44 wherein at least one of said first and second prism polarizers comprises:

a Glan-Thompson calcite prism polarizer.

46. The apparatus of claim 44 wherein said vapor cell comprises:

a pyrex cesium vapor cell.

47. The apparatus of claim 28 wherein said first filter means further comprises:

third filter means for filtering said first divided encoded light beam, said third filter means rejecting a second selected wavelength.

48. The apparatus of claim 43 wherein said first filter means comprises:

a Faraday Anomalous Dispersion Optical Filter.

* * * * *